US009385970B2

(12) United States Patent
Chandrachood

(10) Patent No.: US 9,385,970 B2
(45) Date of Patent: Jul. 5, 2016

(54) METHOD AND APPARATUS FOR ASSIGNING RESOURCES IN A NETWORK NODE

(75) Inventor: Santosh Chandrachood, Milpitas, CA (US)

(73) Assignee: WiChorus, Inc., Santa Clara, CA (US)

( * ) Notice: Subject to any disclaimer, the term of this patent is extended or adjusted under 35 U.S.C. 154(b) by 637 days.

(21) Appl. No.: 12/900,243

(22) Filed: Oct. 7, 2010

(65) Prior Publication Data

US 2011/0085571 A1   Apr. 14, 2011

Related U.S. Application Data

(60) Provisional application No. 61/278,486, filed on Oct. 7, 2009.

(51) Int. Cl.
*H04L 12/28* (2006.01)
*H04L 12/931* (2013.01)
*H04L 12/24* (2006.01)

(52) U.S. Cl.
CPC ............ *H04L 49/50* (2013.01); *H04L 41/0896* (2013.01)

(58) Field of Classification Search
None
See application file for complete search history.

(56) References Cited

U.S. PATENT DOCUMENTS

| 6,707,826 | B1 | 3/2004 | Gorday et al. | |
| 7,039,026 | B2* | 5/2006 | Francoeur | H04W 88/06 370/328 |
| 7,065,083 | B1 | 6/2006 | Oren et al. | |
| 7,065,085 | B2 | 6/2006 | Shin | |
| 7,076,551 | B2 | 7/2006 | Gary | |
| 7,277,948 | B2 | 10/2007 | Igarashi et al. | |
| 7,657,706 | B2* | 2/2010 | Iyer et al. | 711/117 |
| 7,706,291 | B2 | 4/2010 | Luft et al. | |

(Continued)

FOREIGN PATENT DOCUMENTS

WO   WO 2011/044396 A2   4/2011

OTHER PUBLICATIONS

Notification of Transmittal of the International Search Report and Written Opinion of the International Searching Authority; International Application No. PCT/US2010/051874, Date of Mailing: Jun. 30, 2011.

(Continued)

*Primary Examiner* — Rhonda Murphy
(74) *Attorney, Agent, or Firm* — Hamilton, Brook, Smith & Reynolds, P.C.

(57) ABSTRACT

Achieving resource management within a network processing unit (NPU) can be challenging due to the NPU's fixed and limited instruction set. In the case of large mobile networks, contexts are dynamic, and each subscriber in the network consumes multiple hardware resources, where a central processing unit (CPU) is typically employed to program individual resources even though generally impractical in high-session rates. To avoid programming individual resources, an example embodiment of the present invention creates a group of resources depending on a category, the group being shared dynamically among subscribers when a subscriber is active in the network. The example embodiment may include a network service processor (NSP) located in a forwarding path, such that the NPU may operate in connection with the NSP to allocate NPU resources using a packetized interface. The example embodiment achieves resource management within the NPU without a host CPU's involvement and without statically delaying resources.

39 Claims, 5 Drawing Sheets

(56) References Cited

U.S. PATENT DOCUMENTS

| | | | |
|---|---|---|---|
| 7,719,995 B2 | 5/2010 | Luft | |
| 7,733,891 B2 | 6/2010 | Reynolds et al. | |
| 7,773,510 B2 | 8/2010 | Back et al. | |
| 7,855,982 B2 | 12/2010 | Ramankutty et al. | |
| 8,018,955 B2 | 9/2011 | Agarwal et al. | |
| 8,036,230 B2 | 10/2011 | Gray et al. | |
| 8,111,705 B1 | 2/2012 | Bartlett et al. | |
| 8,111,707 B2 * | 2/2012 | Riddle et al. | 370/412 |
| 8,284,786 B2 * | 10/2012 | Mirandette et al. | 370/401 |
| 8,381,264 B1 * | 2/2013 | Corddry et al. | 726/3 |
| 8,447,803 B2 * | 5/2013 | Boucher | H04L 12/5693 370/528 |
| 8,531,945 B2 | 9/2013 | Chandrachood et al. | |
| 8,533,360 B2 | 9/2013 | Chandrachood et al. | |
| 8,745,179 B2 * | 6/2014 | Raghavan et al. | 709/221 |
| 9,106,563 B2 | 8/2015 | Chandrachood et al. | |
| 2001/0049753 A1 | 12/2001 | Gary | |
| 2005/0050136 A1 | 3/2005 | Golla | |
| 2006/0026682 A1 | 2/2006 | Zakas | |
| 2008/0013470 A1 | 1/2008 | Kopplin | |
| 2008/0137646 A1 | 6/2008 | Agarwal et al. | |
| 2008/0155101 A1 | 6/2008 | Welsh et al. | |
| 2008/0274729 A1 | 11/2008 | Kim et al. | |
| 2009/0083367 A1 | 3/2009 | Li et al. | |
| 2009/0086651 A1 | 4/2009 | Luft et al. | |
| 2009/0116513 A1 | 5/2009 | Gray et al. | |
| 2009/0129271 A1 | 5/2009 | Ramankutty et al. | |
| 2009/0285225 A1 | 11/2009 | Dahod | |
| 2010/0191839 A1 * | 7/2010 | Gandhewar et al. | 709/220 |
| 2010/0192207 A1 | 7/2010 | Raleigh | |
| 2010/0229192 A1 | 9/2010 | Marilly et al. | |
| 2010/0325275 A1 | 12/2010 | Van Elburg et al. | |
| 2011/0020236 A1 | 1/2011 | Bohmer et al. | |
| 2011/0021236 A1 | 1/2011 | Dinan et al. | |
| 2011/0080886 A1 | 4/2011 | Chandrachood | |
| 2011/0085439 A1 | 4/2011 | Chandrachood et al. | |
| 2011/0085571 A1 | 4/2011 | Chandrachood | |
| 2011/0087786 A1 | 4/2011 | Chandrachood | |
| 2011/0087798 A1 | 4/2011 | Chandrachood | |
| 2011/0238855 A1 | 9/2011 | Korsunsky et al. | |
| 2012/0239626 A1 * | 9/2012 | Aysan | H04L 45/02 707/674 |

OTHER PUBLICATIONS

International Preliminary Report on Patentability; International Application No. PCT/US2010/051874 Date of Mailing: Apr. 19, 2012.

\* cited by examiner

METHOD AND APPARATUS FOR ASSIGNING RESOURCES IN A NETWORK NODE

RELATED APPLICATION

This application claims the benefit of U.S. Provisional Application No. 61/278,486, filed on Oct. 7, 2009, the entire teachings of which are incorporated herein by reference.

BACKGROUND OF THE INVENTION

Network management systems use network resource management in telecommunications networks to maintain an understanding of a status of link resources and allocations, among other reasons. Resource management is used to track and manage network capacity, such as bandwidth, as well as other network resources. Resource management can occur at many hierarchical levels within a network, such as at traffic control nodes, gateways, routers, or switches. Within such nodes are often control circuits, such as central processing units (CPUs), which communicate with other nodes at a control plane level via a node-to-node control channel (i.e., inter-node control channel). The CPUs control states of traffic modules, such as network processing units (NPUs), operating at a data plane level via a CPU-to-NPU control channel (i.e., intra-node control channel). In a typical NPU programming paradigm, a host CPU accesses and programs the NPU resources using a control channel. Communications between the CPU and NPU may be bidirectional to enable the CPU to monitor a state of the NPU, or other data plane processors or modules within the node. Such bidirectional communications between control and data enables service providers to provision network nodes based on network congestion or other states, such as faults within the network, and to maintain sufficient resources for traffic to traverse network communications paths without interruption.

SUMMARY OF THE INVENTION

An example embodiment of the present invention is a network functional element, e.g., a line card in a gateway for assigning resources in a network node. Components integrated with or used by the functional element determine provisioning information in a data plane based on subscriber information that is available at the data plane. The components are configured to look-up data plane resources in order to determine subscriber services, such that the data plane resources can be assigned to the subscriber services in the network node.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
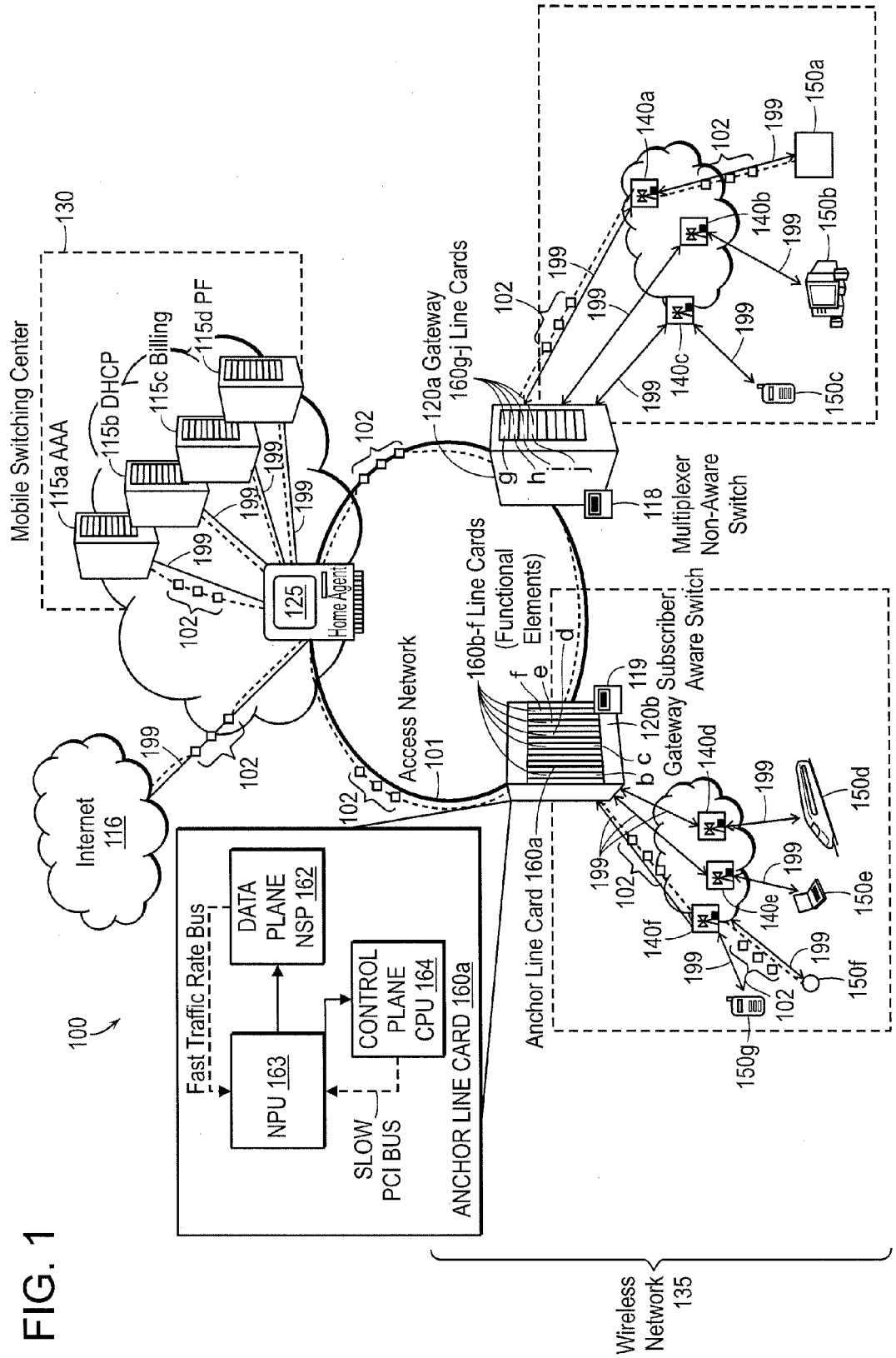
FIG. 1 is a network diagram including multiple network elements connected via wireline and wireless mediums.

A description of example embodiments of the invention follows.

Sophisticated resource management employing a network processing unit (NPU) can be challenging due to fixed and limited instruction set(s) of the NPU. In a typical NPU programming paradigm, a host central processing unit (CPU) has access to NPU resources; the CPU programs the NPU resources using a control channel within a network node. This model is suitable in cases in which contexts are relatively static and resources are available at all times. However, in the case of a large mobile network with interconnected networks, contexts are dynamic and each subscriber in the network can consume multiple hardware resources, such as statistics pointers, policers, forwarding entries, and the like. In many designs, any time new information is learned about the resources in real-time, the CPU must be involved in order to program these resources. However, as mobile services become a more active part of network services overall, CPU involvement became impractical due to high session rates; for example, 5-tuple flow information is learned at a rate of over 100K 5-tuples per second.

One example embodiment of the present invention that leads to suitable resolution of resource allocation in mobile networks is through avoiding programming individual resources attached to each subscriber. Alternatively, another example embodiment creates a pool or group of resources, divided into categories, for example, which can be shared dynamically when a flow or subscriber is active in the network.

Embodiments of the present invention include methods, network elements, and computer readable media products for assigning resources in a network node by dynamically allocating NPU resources in a fast path (i.e., data plane, as opposed to a control plane) without a host CPU and without a static hold on the NPU resources. An example embodiment of the present invention includes an apparatus, for example, a functional element, physical or logical, in a network node that includes a determination module to determine provisioning information in a data plane based on subscriber information that is available in the data plane, a performance module that looks-up data plane resources based on the subscriber information in order to determine a subscriber service, and an assignment module that assigns the data plane resources in the data plane to the subscriber services in that (or a different) network node.

Embodiments of the present invention provide various technical advantages over conventional methods and apparatuses for allocating resource in a network node, such as allocating network processing unit resources dynamically in the fast path, without host central processing unit involvement and without statically holding-up resources. Some of these technical advantages are shown and described in the following description of the present invention with respect to the accompanying figures. Certain embodiments of the present invention may enjoy some, all, or none of these advantages. Other technical advantages may be readily apparent to those skilled in the art from the accompanying figures or claims.

FIG. 1 is a network diagram of a network 100 illustrating aspects of an example embodiment of the invention. The network 100 can be any type of network configured to enable wireless access, such as a wide area network (WAN) having wireless access thereto, wireless broadband network employing a Worldwide Interoperability for Microwave Access (WiMax) network, High Speed Packet Access (HSPA) network, 3$^{rd}$ or 4$^{th}$ Generation Partnership Project Long Term Evolution (GPP LTE) network, or other commonly employed or hereafter-developed network. The network 100 can include at least one access network 101 to interconnect operably with a number of network elements, which may include, for example, mobile end user devices (hereinafter "mobile devices") 150a-g.

The access network 101 can connect basic network elements such as a mobility management entity (MME) (not shown), home location register (HLR) (not shown), home agent 125, gateways 120a-b, or other known network elements. The access network 101 connects to at least one base transceiver station (base station) 140a-f, either directly or through additional networks, such as an edge network (not shown), which connects mobile devices 150a-g via a telecommunications interface or wireless medium, e.g., an air interface. The home agent 125 further connects the wireless network 135 portion of the network 100 to external networks, e.g., the Internet 116 or a mobile switching center 130 containing service portals 115a-d. The service portals 115a-d can provide support for multiple service types through use of, for example, an authentication, authorization, and accounting (AAA) server 115a, dynamic host configuration protocol (DHCP) server 115b, billing server 115c, home policy function (PF) server 115d, or other type of portal that may be used at the mobile switching center 130. The AAA server 115a may provide authentication services to validate a subscriber, authorization to determine the subscriber's rights, and accounting to determine subscriber's usage. The DHCP server 115b may provide for address allocation services in a manual, automatic, or dynamic manner, or as otherwise provided by a network administrator. The home PF server 115d may provide general policy rules or application dependent policy rules. The home PF server 115d may also evaluate network requests against the policies and may be associated with a home policy database, which may be associated with a network service provider.

Continuing to refer to FIG. 1, traffic 102, originating at a mobile device such as a portable mobile device 150a, may travel toward its respective base station 140a via a wireless medium 199. The base station 140a may, in turn, forward the traffic 102 to a corresponding gateway 120a via a wired or wireless medium 199. The gateway 120a can be any of a multitude of wireless gateways, such as an Access Signaling Node Gateway (ASN-GN), Gateway GPRS Support Node (GGSN), Serving General Packet Radio Service Support Node (SGSN), System Architecture Evolution (SAE) gateway, or other currently known or hereafter-developed gateway.

An example embodiment of the present invention can include a subscriber-aware switch, such as switch 119 in FIG. 1, which directs traffic from a subscriber device 150a-g to a specific line card where the subscriber's profile is maintained; for example, the subscriber-aware switch 119 can be configured to determine a subscriber profile or a subscriber identifier associated with the communications traffic 102. The switch 119 is a subscriber-aware switch and has knowledge of the subscriber's profile location or can determine the anchor line card 160a, among the multiple line cards 160a-f for a subscriber device. Conversely, previous switches are non-subscriber-aware switches, for example, such as a multiplexer switch 118, which merely switches traffic without awareness or knowledge of the traffic's destination. Details of a subscriber-aware switch are described further in Applicants' pending U.S. patent application Ser. No. 12/900,354 filed concurrently Oct. 7, 2010, entitled "Method and Apparatus for Switching Communications Traffic in a Communications Network" by Santosh Chandrachood and Pawan Uberoy, which claims priority to Applicants' U.S. Provisional Patent Application No. 61/278,496, filed Oct. 7, 2009, entitled "A Method and Apparatus for Subscriber Distribution and Load Balancing Using Mid-Plane Design in a Subscriber Aware Platform Such as ASN Gateway, GGSN, SGSN etc." by Chandrachood et al., the entire teachings of both applications being incorporated herein by reference in their entirety.

In the example network 100, the gateway 120b contains at least one functional element, such as a line card 160a, which supports traffic packets, or other traffic signals, at traffic rates; multiple line cards in a chassis 160b-f can also be present.

The functional element 160a (described in more detail below in reference to FIG. 2) receives the traffic 102, from the downstream base station 140f, and may perform network resource functions prior to transmitting the traffic 102 to the home agent 125 or final destination. The functional element 160a can be an anchor line card, such that the anchor line card 160a includes information about a subscriber in the network. For example, a subscriber 150f may have a profile at the line card 160a, which is thereby designated as the anchor line card from among other line cards 160b-f because the subscriber's 150f profile is located at that line card 160a. However, any of the line cards 160a-f at gateway 120b can be designated as the anchor line card based on information such as the subscriber device or a subscriber identifier.

Example embodiments of the present invention provide for a network processing unit (NPU) 163 to request information regarding a subscriber in the network 100 from a network service processor (NSP) 162. The NSP 162, located in a data plane of the anchor line card 160a, provides a "fast path" (i.e., data plane, as opposed to a "slow path." i.e., control plane) look-up of subscriber information in the NSP 162 subscriber database (not shown). The NSP 162 may also provide the NPU 163 with the subscriber information in a resource map (not shown) via a traffic rate bus. The traffic rate bus from the NSP 162 to the NPU 163 allows for high traffic rates without using a central processing unit (CPU) 164, which is located in a control plane of the anchor line card 160a and is connected to the NPU 163 via a PCI bus. The PCI bus and the CPU 164 are slow mechanisms of transfer and cause allocation of resources to be slow, accordingly, as compared to rates of data bus.

Figure 2:
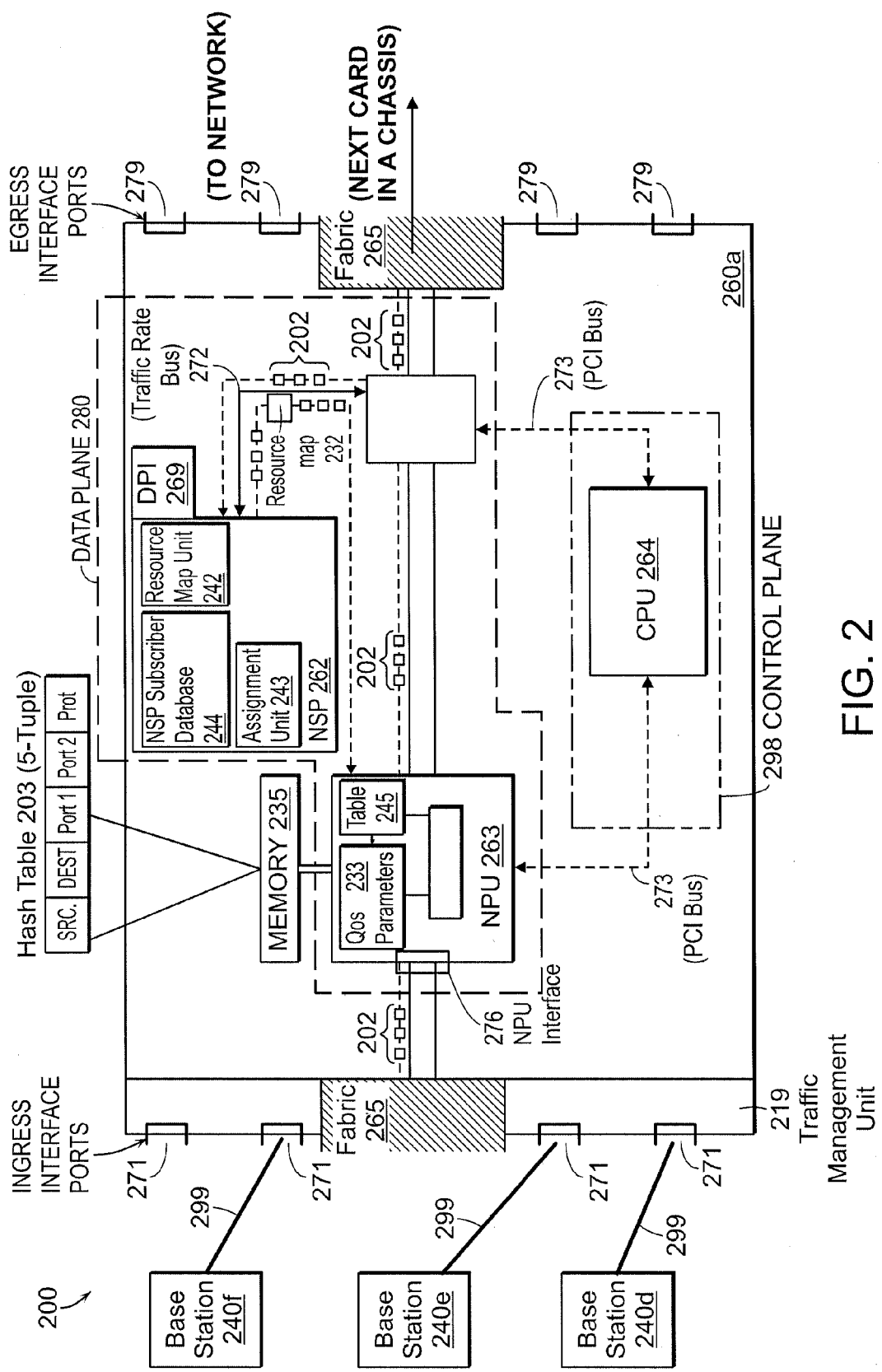
FIG. 2 is a system diagram illustrating an embodiment of a functional element of the present invention.

FIG. 2 is a system diagram 200 of a functional element 260a illustrating aspects of an example embodiments of the invention. The functional element 260a can be designated as an anchor functional element (as illustrated in FIG. 1, 160a); the anchor functional element 260a can be, for example, a line card in a gateway (not shown). The functional element 260a can include a network processing unit (NPU) 263, which can be located on the data plane 280 of the functional element 260a. The NPU 263 operating in the data plane 280 can include, for example, a table 245, quality of service (QoS) table 233, or NPU interface 276. Details of QoS are described further in Applicants' pending U.S. patent application Ser. No. 12/900,324 filed concurrently Oct. 7, 2010, entitled "Method and Apparatus for Efficient Resource Allocation of Quality of Service Profiles in Mobile Networks" by Santosh Chandrachood and Henry Fung, which claims priority to Applicants' U.S. Provisional Patent Application No. 61/278, 505, filed Oct. 7, 2009, entitled "A Method and Apparatus for Efficient Resource Allocation of Quality of Service Profiles in Mobile Networks" by Chandrachood et al., the entire teachings of both applications being incorporated herein by reference in their entirety. The functional element 260a can include further a central processing unit (CPU) 264, which can operate at the control plane 298. The functional element 260a further can include a network service processor (NSP) 262, which can operate in the data plane 280. The NSP 262 can include, for example, an NSP subscriber database 244, assignment unit 243, or resource map unit 242. The NSP 262 may be interconnected operably to a deep packet inspection (DPI) module 269. Details of deep packet inspection are described further in Applicants' pending U.S. patent application Ser. No. 12/900,346 filed concurrently Oct. 7, 2010, entitled "Method and Apparatus to Support Deep Packet Inspection in a Mobile Network" by Santosh Chandrachood, Pawan Uberoy and Rehan Jalil, which claims priority to Applicants' U.S. Provisional Patent Application No. 61/278, 518, filed Oct. 7, 2009, entitled "Method and Apparatus to Support Network-Initiated VoIP voice over IP telephony using deep packet inspection" by Chandrachood and Applicants' U.S. Provisional Patent Application No. 61/278,519, filed Oct. 7, 2009, entitled "Method and Apparatus to Support Transfer of Context Generated Using Deep Packet Inspection Across Mobile Elements" by Chandrachood et al., the entire teachings of both applications being incorporated herein by reference in their entirety.

To begin processing, a traffic packet 202 is sent by a base station 240d-f, via a wireless interface 299, and received by a traffic management entity 219, via any of a multitude of ingress-interface ports 271. The ingress-interface ports 271 being determined based on protocols in the traffic packet 202 or alternatively, determined by a network management entity. The traffic packet 202 enters the NPU 263 via an NPU interface 276; after examining the traffic packet 202, the NPU 263 may perform a look-up of provisioning information in a subscriber table 244 based on subscriber information available in the data plane 280.

If NPU 263 cannot locate subscriber information, it can transmit the first traffic packet 202 to the NSP 262, which can look-up the subscriber information in an NSP subscriber database 244. Following locating the subscriber information, the NSP 262 can create or amend the resource map 232, at a mapping unit 242, including the located subscriber information in a resource map 232 and assign data plane resources in an assignment unit 243. Data plane resources can include policers, forwarding entries, QoS parameters 233, subscriber information or profiles, or other data plane resources. The NSP 262 returns the first packet 202 to the NPU 263 with the resource map 232 in a fast-packet processing path 272, such as a traffic rate bus or control channel; the fast-packet processing path 272 can operate at traffic rates or multiples thereof. Following receipt of the first packet 202 and resource map 232 at the NPU 263, the NPU 263 can store the resource map in a memory 235, which can be a ternary content addressable memory (TCAM), or other finite memory. The NPU 263 can dynamically create a hash table entry 203, such as a 5-tuple entry or the dynamically generated table can include a subscriber Internet protocol (IP) address or other table entries, in the memory 235, which points to the resources allocated by the NSP 262 to be used by the NPU 263. The 5-tuple entry can include information, regarding the traffic packet 202 that was returned from the NSP 262 with the resource map 232, such as a source, destination, first port, second port, and protocol to be used.

The NPU may not contain any subscriber information until it receives a return packet from the NSP.

The NPU 263 can process any subsequent packets, belonging to the first packet flow, based on the resource map 232. In an embodiment where subsequent packets, belonging to the first packet flow of packet 202, continue to arrive, the hash table entry 203 does not age out of the memory 235; the hash table entry 203 can auto refresh. Further, the NPU 263 may determine hardware resources based on packets received from the NSP 262 in real time, as well as, scaling network resources using multicast messaging and using the hash table entry 203.

During periods of idle activity at the NPU 263, such as no packets entering the functional element 260a, the NPU 263 can notify the NSP 262 with subscriber information and the resource map 232, so that the NSP 262 may age out flow information from a cache (not shown), allowing the resource map 232 to be marked as free and open for another request. Following process completion of packets mapped to the same resources, the NPU 263 can forward the packets 202 to an additional functional element (not shown) using the fabric 265 or the NPU 263 can transmit the processed packets to an element external to the functional element 260a via any output-egress port 279. The output-egress port 279 can be determined based on the routing protocol of the traffic packet 202, for example, the protocol stored in the 5-tuple entry.

In alternative example embodiments, the aging process can be explicitly provided for via signaling protocols or other control methods. For example, in the situation of session initiation protocol (SIP), the SIP will generate a "bye" message that will signal a module, such as the NSP, to tear down resources. Further examples can include the NPU having an awareness of the signaling that is being torn down and using such information to signal another module, such as the NSP, to tear down its resources. In alternative situations the NPU may not recognize the idle period and can continue to send the control channel information to the NSP, the NSP can realize the session is completed and tear down resources.

In alternative example embodiments, additional methods of table learning can be used, such as, tree, array, radix tree, hash table, 5-tuple, or other table entries commonly employed or hereafter developed.

Alternative embodiments of the present invention may include a module or set of modules in the NSP 262 that collect subscriber information that can include subscriber identifiers, subscriber QoS parameters, deep packet inspection (DPI) parameters, or additional subscriber information, any of which may be passed between or among the NPU 263 and NSP 262 as a specialized packet (not shown). In further alternative embodiments, it is possible to collect information and assign resources because the NPU 263 and NSP 262 are operably interconnected. The NPU 263 does not have to pre-program contexts (e.g., policers, forwarding entries, QoS parameters, classifiers, etc.) such that the hardware resources are statically reserved. Such embodiments enable dynamic resource allocation without involvement of a central processing unit (CPU) 264.

In some example embodiments, QoS can allow for resource reservation and control or can provide different priorities to different elements of the network. QoS may include, for example, providing different services based on applications, subscribers, performance level, data flows, or other commonly known or here-after developed elements requiring QoS specifications. QoS parameters can include, for example, delay, jitter, bit rate, guarantees, bandwidth, or other commonly employed or hereafter-developed parameters pertaining to QoS in a network.

In alternative example embodiments of the present invention, network resources or hardware resources can include, for example, NPU, CPU, or other hardware resources such as search capabilities, TCAM, control functions, statistics, memory channels, fabric buffering memory, fabric backplane, or other commonly known or hereafter developed network resources. Details of network and hardware resources are described further in Applicants' pending U.S. patent application (Serial Number not yet assigned) being filed concurrently herewith, entitled "Method and Apparatus to Report Resource Values in a Mobile Network" by Santosh Chandrachood, which claims priority to Applicants' U.S. Provisional Patent Application No. 61/278,520, filed Oct. 7, 2009, entitled "A Method and Apparatus to Read Large Hardware Counters in a Scalable Way" by Chandrachood et al., the entire teachings of both applications being incorporated herein by reference in their entirety.

Further example embodiments of the present invention may include the traffic packet 202 sent from a second functional element (not shown) to the functional element 260a via the fabric 265 or the traffic packet 202 may enter the NPU 263 directly without entering a traffic management entity 219. Alternative embodiments of the present invention can connect hardware components, for example, the CPU 264, memory 235, NPU 263, NSP 262, or additional components used in a line card, via component subsystems, such as PCI bus 273, or other known or future developed methods for operably interconnecting hardware. Alternatively, example embodiments of the present invention can include any of the NPU, CPU, or NSP operating in the control plane of the functional element.

Figure 3:
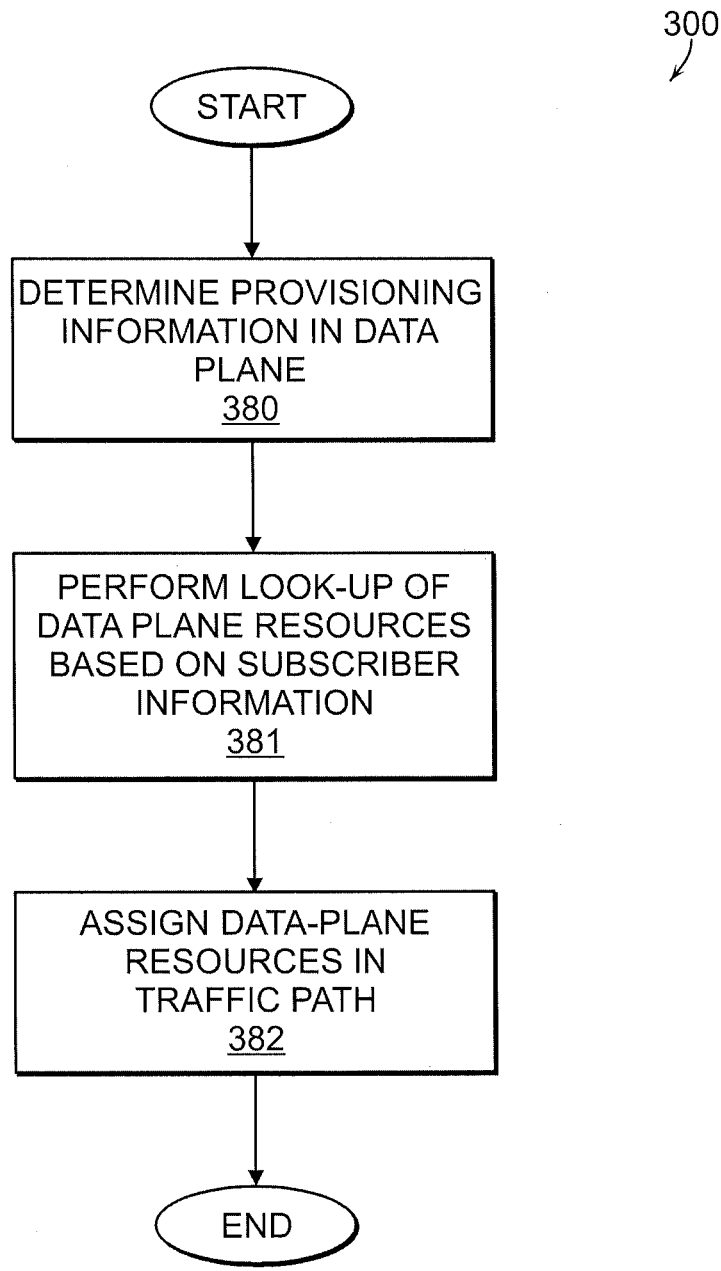
FIG. 3 is a flow chart illustrating an embodiment of the present invention provisioned to assign resources in a network node.

FIG. 3 is a flow chart 300 of an embodiment of the present invention illustrating assigning resources in a network node, such as the gateway 120b of FIG. 1.

In the example flow chart 300, a determination is made as to the provisioning information available or existing in a data plane based on subscriber information available in the data plane (380). Next, a look-up of data plane resources is performed to determine subscriber services based on the subscriber information available in the data plane (381). Finally, the data plane resources are assigned to the subscriber services in the network node (382).

Figure 4:
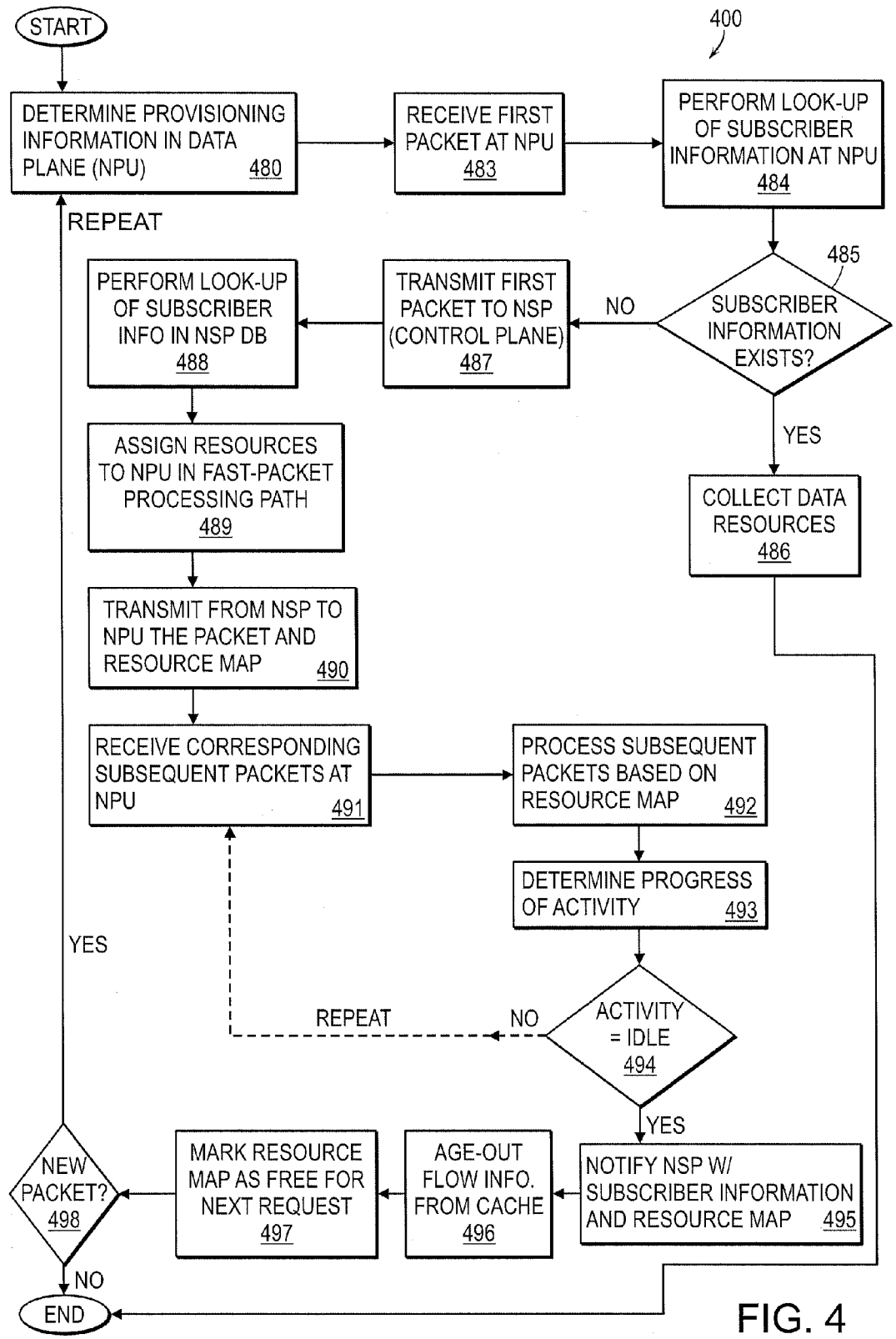
FIG. 4 is a flow diagram illustrating an embodiment of the present invention.

FIG. 4 is a flow diagram 400 illustrating an embodiment of the present invention in which an assignment of data plane resources in a network node, such as the gateway 120b of FIG. 1, is performed using a resource assignment procedure. The example embodiment is performed in reference to a network node having a configuration consistent with the example embodiment of FIG. 2. Other node configurations can result in a resource assignment procedure different from the example described in reference to the example of FIG. 4.

After beginning, the assignment procedure of FIG. 4 determines provisioning information in the data plane (480), where the data plane includes a network processing unit (NPU). The NPU receives a first packet (483) and performs a look-up of subscriber information at the NPU (484). A determination is made as to whether the subscriber information exists at the NPU (485); if subscriber information exists at the NPU, data resources for that subscriber are collected and the procedure ends. Alternatively, if no subscriber information exists at the NPU, the packet is transmitted to a network service processor (NSP) (487), where the NSP is also in the data plane or can be logically or physically configured to operate with the data plane.

Once the packet is transmitted to the NSP, the NSP performs a look-up of the subscriber information associated with or corresponding to the received traffic packet in an NSP database (488). The NSP provides the subscriber information and assigns associated data plane resources, optimally in a form of a resource map, in a fast-packet-processing path (i.e., in the data plane), to the NPU (489). The NSP and transmits the traffic packet and associated resource map, including at least the data plane resources, to the NPU (490). Once the traffic packet and resource map are received by the NPU, and upon receiving corresponding subsequent packets at the NPU (491), the NPU can process the subsequent packets by employing the resource map (492).

Following completion of processing the traffic flow or during intervals as may be determined by a network management entity, the NPU can determine if traffic activity is idle (493). If traffic is not idle, the NPU can continue to receive corresponding subsequent packets (491). However, if it is determined that traffic is idle, the NPU can notify the NSP of the idle status and include the currently known subscriber information and corresponding resource maps (495). Alternatively, the NPU can notify the NSP of idle status without additional information. The NSP ages-out flow information from a cache (496) and marks resources, such as the resource map, free for a next request for a look-up from the NPU (497). A determination is made as to whether a packet not affiliated with subscriber information currently known by the NPU is received (498); if such packet is identified, the procedure of the flow diagram 400 begins again (480).

Figure 5:
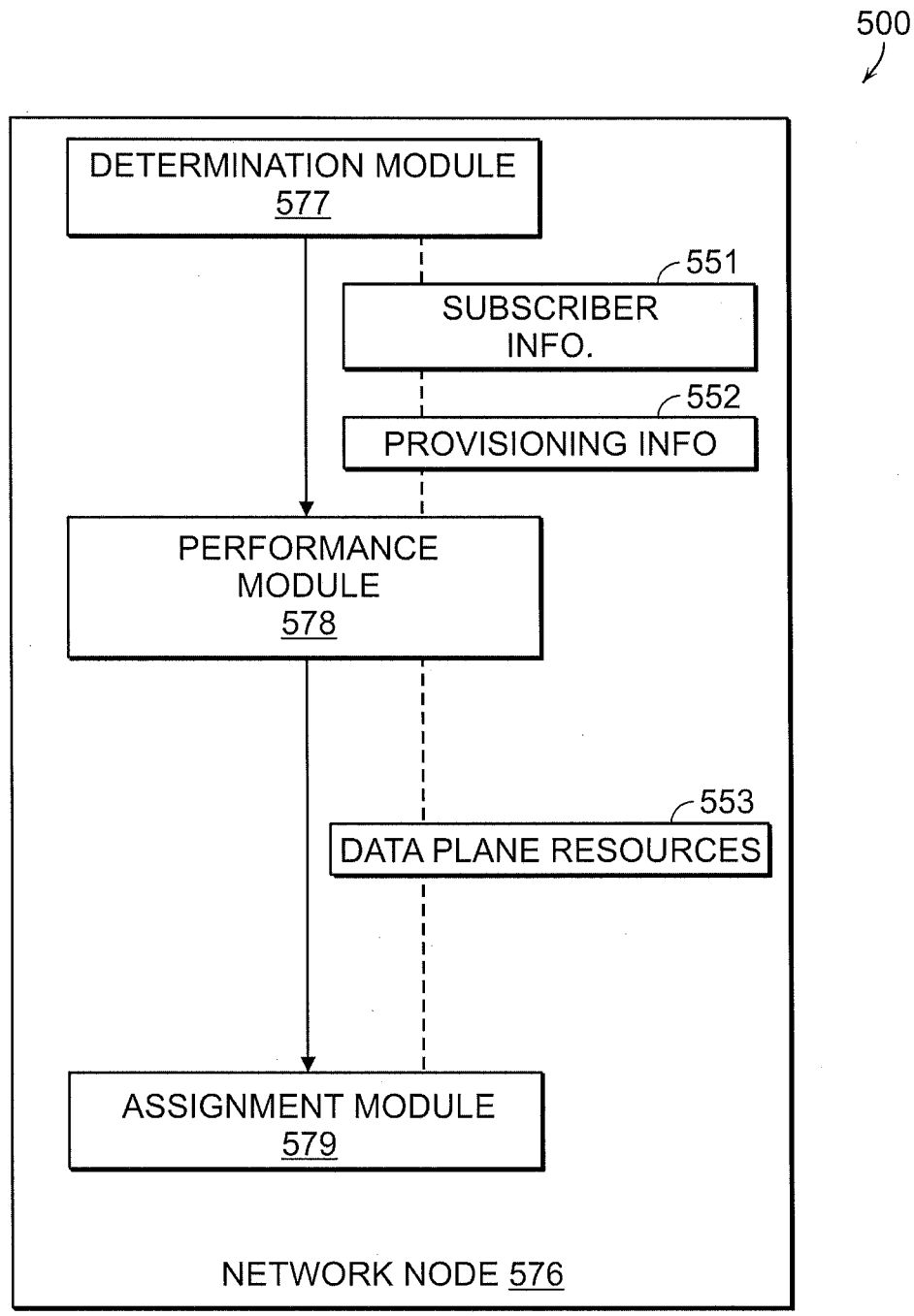
FIG. 5 is a block diagram illustrating an embodiment of the present invention.

FIG. 5 is a block diagram 500 of a network node 576 illustrating aspects of an example embodiment of the present invention. The block diagram 500 can be a physical or logical representation and may exist, for example, in a line card at a gateway node in a network, such as the network 100 of FIG. 1, or distributed among multiple different physical or logical network elements. The example embodiment of the block diagram 500 can include a determination module 577, performance module 578, and assignment module 579 according to an example embodiment of the present invention. According to the example embodiment, the determination module 577 determines provisioning information 551 based on subscriber information 552 available in a data plane and can pass that information to the performance module 578. The performance module 578 uses the subscriber information 551 to perform a look-up of data plane resources 553, which can be passed as information to the assignment module 579. The assignment module 579 assigns the data plane resources 553 to subscriber services.

Further example embodiments of the present invention may include a non-transitory computer readable medium containing instructions that may be executed by a processor, and, when executed by the processor, cause the processor to monitor the information, such as status, of at least a first and second network element. It should be understood that elements of the block and flow diagrams described herein may be implemented in software, hardware, firmware, or other manifestation available in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read only memory (CD-ROM), and so forth. In operation, a general purpose or application-specific processor loads and executes the software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the invention.

While this invention has been particularly shown and described with references to example embodiments thereof, it will be understood by those skilled in the art that various changes in form and details may be made therein without departing from the scope of the invention encompassed by the appended claims.

What is claimed is:

1. A method for assigning resources in a network node, the method comprising:
   determining provisioning information in a data plane as a function of subscriber information available in the data plane;
   performing a look-up of data plane resources in the data plane, based on reception of a traffic packet in a traffic flow, as a function of the subscriber information to determine subscriber services;
   determining whether the subscriber information exists at a traffic processing element operating in the data plane and collecting data resources based on a first determination that the subscriber information exists; and
   assigning, in a fast-packet processing path in the data plane, the data plane resources in the data plane to the subscriber services in the network node, based on a second determination that the subscriber information does not exist at the traffic processing element, the assigning enabling processing of subsequent packets of the traffic flow based on the data plane resources assigned.

2. The method of claim 1 wherein the determining, performing, and assigning are performed dynamically based on traffic received in the data plane.

3. The method of claim 1, wherein the look-up is a first look-up, the traffic processing element is a network processing unit (NPU), and further wherein the method of claim 1 further comprises:
   (i) following receipt of a first packet at the NPU, performing the first look-up in the NPU;
   (ii) looking-up the subscriber information and collecting the data resources in the NPU;
   (iii) if no subscriber information is found, transmitting the first packet to a network service processor (NSP);
   (iv) performing, at the NSP, a second look-up of the subscriber information in a NSP database and, by the NSP, assigning the data plane resources in the fast-packet processing path to the NPU;
   (v) feeding-back the first packet with a resource map from the NSP to the NPU;
   (vi) processing subsequent packets at the NPU employing the resource map received;
   (vii) during idle activity, notifying the NSP with subscriber information and resource map and aging out flow information from a cache;
   (viii) marking the resource map free for a next request; and
   (ix) repeating (i)-(viii) for each new packet.

4. The method of claim 3 further comprising employing specialized packets from the NSP to the NPU to forward subscriber information.

5. The method of claim 1, wherein the traffic processing element is a processing unit (NPU), and the method of claim 1 further comprises determining in real-time, NPU resources at the NPU based on packets received from a network service processor (NSP), the NPU being interconnected operably to the NSP.

6. The method of claim 5 further comprising scaling resources, at the NPU, using multicast messaging.

7. The method of claim 5 further comprising using a hash table entry with 5-tuple resources in the NPU.

8. The method of claim 5 wherein the NPU includes a packetized interface.

9. The method of claim 1 further comprising:
   collecting subscriber identifiers;
   collecting subscriber quality of service (QoS) parameters; and
   honoring deep packet inspection parameters based on at least a subset of the subscriber identifiers and QoS parameters.

10. The method of claim 1 further comprising counting resources in the data plane including static and dynamic resource counting.

11. The method of claim 1, wherein the traffic processing element is a processing unit (NPU), and further wherein the method of claim 1 further comprises:
   operatively coupling the NPU to a network service processor (NSP) in the data plane, wherein the NSP in the data plane provides subscriber information for a subscriber in the network in response to a request from the NPU in the data plane and assigns associated data plane resources in the data plane, in a form of a resource map, to the NPU in the data plane.

12. The method of claim 11 wherein the NPU is configured to process traffic packets by employing the resource map.

13. The method of claim 1 wherein assigning the data plane resources in the data plane includes assigning at least one of a policer, forwarding entry, or classifier to the subscriber services based on the look-up performed.

14. A functional element for assigning resources in a network node, the functional element comprising:
   a determination module configured to determine provisioning information in a data plane as a function of subscriber information available in the data plane;
   a traffic processing element operating in the data plane;
   a performance module configured to perform a look-up of data plane resources in the data plane, based on reception of a traffic packet in a traffic flow, as a function of the subscriber information to determine subscriber services, and to determine whether the subscriber information exists at the traffic processing element, the traffic processing element configured to collect data resources based on a first determination that the subscriber information exists; and
   an assignment module configured to assign, in a fast-packet processing path in the data plane, the data plane resources in the data plane to the subscriber services in the network node, based on a second determination that the subscriber information does not exist at the traffic processing element, the assignment enabling processing of subsequent packets of the traffic flow based on the data plane resources assigned.

15. The functional element of claim 14 wherein the determination module, performance module, and assignment module are configured to operate dynamically based on traffic received in the data plane.

16. The functional element of claim 14 wherein the look-up is a first look-up and further wherein:
   the traffic processing element is a network processing unit (NPU) configured to:
   (i) perform a look-up function following receipt of a packet;
   (ii) look-up subscriber information and collect the data resources in the NPU;
   (iii) if no subscriber information is found, transmit a first packet to a network service processor (NSP), the NSP configured to perform a second look-up of the subscriber information in a NSP database and assign the data plane resources in the fast-packet processing path to the NPU;
(iv) receive the first packet with a resource map from the NSP;
(v) process subsequent packets employing the resource map received;
(vi) notify the NSP, during idle activity, with subscriber information and resource map and configured to age out flow information from a cache, where the resource map is marked free for a next request; and
further wherein:
(vii) the NPU and NSP are configured to operate on each new packet.

17. The functional element of claim 14 wherein the traffic processing element is a network processing unit (NPU) further configured to determine, in real-NPU resources at the NPU based on packets received from a network service processor (NSP).

18. The functional element of claim 17 wherein the NPU is further configured to scale resources using multicast messaging.

19. The functional element of claim 17 wherein the NPU is further configured to use a hash table entry with 5-tuple resources.

20. The functional element of claim 17 wherein the NSP and the NPU are further configured to employ specialized packets there between.

21. The functional element of claim 14 further comprising:
a collection module coupled to the assignment module and configured to collect subscriber identifiers and subscriber quality of service (QoS) parameters; and
a deep packet inspection module configured to honor deep packet inspection parameters based on at least a subset of the subscriber identifiers and QoS parameters.

22. The functional element of claim 14 comprising at least one of a static resource counter and a dynamic resource counter.

23. A non-transitory computer program product including a computer readable medium having computer readable instructions stored thereon, wherein the computer readable instructions when executed by a processor, cause the processor to:
determine provisioning information in a data plane as a function of subscriber information available in the data plane;
perform a look-up of data plane resources in the data plane, based on reception of a traffic packet in a traffic flow, as a function of the subscriber information;
determine whether the subscriber information exists at a traffic processing element operating in the data plane and collect data resources based on a first determination that the subscriber information exists; and
assign, in a fast-packet processing path in the data plane, the data plane resources in the data plane to the subscriber services in the network node, based on a second determination that the subscriber information does not exist at the traffic processing element, the assigning enabling processing of subsequent packets of the traffic flow based on the data plane resources assigned.

24. A method for assigning resources in a network node, the method comprising:
determining provisioning information in a data plane as a function of subscriber information available in the data plane;
performing a first look-up of data plane resources in the data plane, based on reception of a traffic packet in a traffic flow, as a function of the subscriber information to determine subscriber services;
assigning, in a fast-packet processing path in the data plane, the data plane resources in the data plane to the subscriber services in the network node, the assigning enabling processing of subsequent packets of the traffic flow based on the data plane resources assigned; and
(i) following receipt of a first packet at a network processing unit (NPU), performing the first look-up in the NPU;
(ii) looking-up the subscriber information and collecting data resources in the NPU;
(iii) if no subscriber information is found, transmitting the first packet to a network service processor (NSP);
(iv) performing, at the NSP, a second look-up of the subscriber information in a NSP database and, by the NSP, assigning the data plane resources in the fast-packet processing path to the NPU;
(v) feeding-back the first packet with a resource map from the NSP to the NPU;
(vi) processing subsequent packets at the NPU employing the resource map received;
(vii) during idle activity, notifying the NSP with subscriber information and resource map and aging out flow information from a cache;
(viii) marking the resource map free for a next request; and
(ix) repeating (i)-(viii) for each new packet.

25. The method of claim 24 further comprising employing specialized packets from the NSP to the NPU to forward subscriber information.

26. The method of claim 24 further comprising determining, in real-time, NPU resources at the NPU based on packets received from a network service processor (NSP), the NPU being interconnected operably to the NSP.

27. The method of claim 24 further comprising scaling resources, at the NPU, using multicast messaging.

28. The method of claim 24 further comprising using a hash table entry with 5-tuple resources in the NPU.

29. The method of claim 24 wherein the NPU includes a packetized interface.

30. The method of claim 24 further comprising:
collecting subscriber identifiers;
collecting subscriber quality of service (QoS) parameters; and
honoring deep packet inspection parameters based on at least a subset of the subscriber identifiers and QoS parameters.

31. The method of claim 24 further comprising counting resources in the data plane including static and dynamic resource counting.

32. A functional element for assigning resources in a network node, the functional element comprising:
a determination module configured to determine provisioning information in a data plane as a function of subscriber information available in the data plane;
a performance module configured to perform a first look-up of data plane resources in the data plane, based on reception of a traffic packet in a traffic flow, as a function of the subscriber information to determine subscriber services; and
an assignment module configured to assign, in a fast-packet processing path in the data plane, the data plane resources in the data plane to the subscriber services in the network node, the assignment enabling processing of subsequent packets of the traffic flow based on the data plane resources assigned; and
a network processing unit (NPU) configured to:

(i) perform a look-up function following receipt of a packet;
(ii) look-up subscriber information and collect data resources in the NPU;
(iii) if no subscriber information is found, transmit a first packet to a network service processor (NSP), the NSP configured to perform a second look-up of the subscriber information in a NSP database and assign the data plane resources in the fast-packet processing path to the NPU;
(iv) receive the first packet with a resource map from the NSP;
(v) process subsequent packets employing the resource map received;
(vi) notify the NSP, during idle activity, with subscriber information and resource map and configured to age out flow information from a cache, where the resource map is marked free for a next request; and wherein:
(vii) the NPU and NSP are configured to operate on each new packet.

33. The functional element of claim 32 wherein the determination module, performance module, and assignment module are configured to operate dynamically based on traffic received in the data plane.

34. The functional element of claim 32 wherein the NPU is further configured to determine, in real-time, NPU resources at the NPU based on packets received from the NSP.

35. The functional element of claim 32 wherein the NPU is further configured to scale resources using multicast messaging.

36. The functional element of claim 32 wherein the NPU is further configured to use a hash table entry with 5-tuple resources.

37. The functional element of claim 32 wherein the NSP and the NPU are further configured to employ specialized packets there between.

38. The functional element of claim 32 further comprising:
a collection module coupled to the assignment module and configured to collect subscriber identifiers and subscriber quality of service (QoS) parameters; and
a deep packet inspection module configured to honor deep packet inspection parameters based on at least a subset of the subscriber identifiers and QoS parameters.

39. The functional element of claim 32 comprising at least one of a static resource counter and a dynamic resource counter.

* * * * *